(12) United States Patent
Allouche

(10) Patent No.: US 10,673,531 B2
(45) Date of Patent: Jun. 2, 2020

(54) APPARATUS HAVING FIRST AND SECOND TRANSCEIVER CELLS FORMED IN A SINGLE INTEGRATED CIRCUIT

(71) Applicant: FINISAR CORPORATION, Sunnyvale, CA (US)

(72) Inventor: David Allouche, Belmont, CA (US)

(73) Assignee: II-VI Delaware Inc., Wilmington, DE (US)

( * ) Notice: Subject to any disclaimer, the term of this patent is extended or adjusted under 35 U.S.C. 154(b) by 0 days.

(21) Appl. No.: 16/150,098

(22) Filed: Oct. 2, 2018

(65) Prior Publication Data

US 2019/0305850 A1    Oct. 3, 2019

Related U.S. Application Data

(60) Division of application No. 14/146,674, filed on Jan. 2, 2014, now Pat. No. 10,090,930, which is a continuation of application No. 13/567,929, filed on Aug. 6, 2012, now abandoned, which is a continuation of application No. 11/368,930, filed on Mar. 6, 2006, now Pat. No. 8,238,699.

(60) Provisional application No. 60/658,558, filed on Mar. 4, 2005.

(51) Int. Cl.
*H04B 10/40* (2013.01)
*H04B 10/25* (2013.01)

(52) U.S. Cl.
CPC ............. *H04B 10/40* (2013.01); *H04B 10/25* (2013.01)

(58) Field of Classification Search
CPC ................................ H04B 10/25; H04B 10/40
See application file for complete search history.

(56) References Cited

U.S. PATENT DOCUMENTS

| 5,502,785 | A | * | 3/1996 | Wang | ........................ | G02B 6/42 |
|---|---|---|---|---|---|---|
| | | | | | | 385/31 |
| 6,963,119 | B2 | * | 11/2005 | Colgan | ..................... | G02B 6/43 |
| | | | | | | 257/431 |
| 2005/0135727 | A1 | * | 6/2005 | Piede | ........................ | G02B 6/42 |
| | | | | | | 385/14 |

* cited by examiner

*Primary Examiner* — Chris H Chu
(74) *Attorney, Agent, or Firm* — Maschoff Brennan

(57) ABSTRACT

An apparatus having first and second transceiver cells formed in a single integrated circuit. In one example embodiment, an apparatus includes a first transceiver cell including a first set of components configured to enable communication on a first communication link in a network and a second transceiver cell formed underneath the first transceiver cell in a single integrated circuit (IC). The second transceiver cell is optically isolated from the first transceiver cell. The second transceiver cell includes a second set of components configured to enable communication on a second communication link in the network.

4 Claims, 5 Drawing Sheets

APPARATUS HAVING FIRST AND SECOND TRANSCEIVER CELLS FORMED IN A SINGLE INTEGRATED CIRCUIT

CROSS-REFERENCE TO RELATED APPLICATIONS

This application is a divisional of U.S. patent application Ser. No. 14/146,674, filed Jan. 2, 2014, titled APPARATUS HAVING FIRST AND SECOND TRANSCEIVER CELLS FORMED IN A SINGLE INTEGRATED CIRCUIT, which is a continuation of U.S. patent application Ser. No. 13/567,929, filed Aug. 6, 2012, titled SEMICONDUCTOR-BASED OPTICAL TRANSCEIVER, which is a continuation of U.S. patent application Ser. No. 11/368,930, filed Mar. 6, 2006, titled SEMICONDUCTOR-BASED OPTICAL TRANSCEIVER, which claims the benefit of U.S. Provisional Application No. 60/658,558, filed Mar. 4, 2005, titled SILICON ONLY (NO PC BOARD) OPTICAL TRANSCEIVER, all of which applications are incorporated herein by reference in their entireties.

BACKGROUND

1. The Field of the Invention

The embodiments disclosed herein relate generally to transceivers. More specifically, the embodiments disclosed herein relate to transceiver cells that do not use a printed circuit board (PCB) for interconnections between the transceiver cells.

2. The Relevant Technology

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed there through, the intensity of the emitted light being a function of the current magnitude. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a driver (e.g., referred to as a "laser driver" when used to drive a laser signal) configured to control the operation of the optical transmitter in response to various control inputs. The optical transceiver may also include a sensing photodiode for monitoring the output of the optical transmitter.

The optical transceiver also generally includes an amplifier (e.g., often referred to as a "post-amplifier") configured to perform various operations with respect to certain parameters of a data signal received by the optical receiver. A TransImpedance Amplifier (TIA) may be implemented to amplify signals received from the optical receiver. A controller circuit (hereinafter referred to as the "controller") controls the operation of the laser driver and post amplifier.

The various components of the optical transceiver are often implemented as one or more integrated circuits or discrete components that are interconnected using a PCB. The use of the PCB to interconnect the various ICs and discrete components, however, is often expensive and time consuming during manufacture of the transceiver as each IC or component must be individually mounted to the PCB.

In addition, individual optical transceivers are often enclosed in some type of encasing or packaging for protection. The use of a PCB board to interconnect the ICs and other components of the optical transceiver, however, often makes it so that the packaging or encasing of the transceiver may potentially be larger, which may cause space problems in a host computing system coupled to the optical transceivers.

BRIEF SUMMARY

Embodiments disclosed herein relate to an apparatus having first and second transceiver cells formed in a single integrated circuit. In at least some example embodiments, each transceiver cell may include a set of components integrated in a single integrated circuit that does not require a printed circuit board for interconnecting these components.

In one example embodiment, an apparatus includes a first transceiver cell including a first set of components configured to enable communication on a first communication link in a network and a second transceiver cell formed underneath the first transceiver cell in a single integrated circuit (IC). The second transceiver cell is optically isolated from the first transceiver cell. The second transceiver cell includes a second set of components configured to enable communication on a second communication link in the network.

In another example embodiment, an apparatus includes a first optical transceiver cell and a second optical transceiver cell. The first optical transceiver cell includes a first substrate on which the following components are directly integrated: a first laser driver, a first control module, a first post-amplifier, a first interconnection between a transmitter and the first laser driver, a second interconnection between the first post-amplifier and a first receiver, a third interconnection between the first post-amplifier and the first control module, and a fourth interconnection between the first control module and the first laser driver. The second optical transceiver cell includes a second substrate on which the following components are directly integrated: a second laser driver, a second control module, a second post-amplifier, a fifth interconnection between a second receiver and the second post-amplifier, a sixth interconnection between the second laser driver and a second transmitter, a seventh interconnection between the second post-amplifier and the second control module, and an eighth interconnection between the second control module and the second laser. The second optical transceiver cell is optically isolated from the first optical transceiver cell and is formed on top of the first transceiver cell in a single integrated circuit (IC).

In yet another example embodiment, a method of multi-communication transceiver integrated circuit (IC) fabrication includes, in a single IC, fabricating a first transceiver cell including a first substrate on which a first set of components is directly integrated, the first transceiver cell configured to communicate on a first communication link at a first bitrate. The method also includes, in the single IC and on top of the first transceiver cell, fabricating a second transceiver cell including a second substrate on which a second set of components is directly integrated. The second transceiver cell is configured to communicate on a second communication link at a second bitrate.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows, and in part will be obvious from the description, or may be learned by the practice of the embodiments disclosed herein. The features and advantages of the embodiments disclosed herein may be realized and obtained by means of the instruments and combinations particularly pointed out in the appended claims. These and other features of the embodiments disclosed herein will become more fully apparent from the following description and appended claims, or may be learned by the practice of the embodiments disclosed herein as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments of the present invention extend to a semiconductor-based optical transceiver. The optical transceiver includes various components that are integrated as a single integrated circuit (IC) without the use of a printed circuit board (PCB) for interconnecting the components. In some embodiments, the optical transceiver includes a post-amplifier that may communicate with an optoelectronic transducer such as a photodiode, an electro-optic transducer driver that may communicate with an electro-optic transducer such as a laser, and a control module that controls the operation of the post-amplifier and electro-optic transducer driver, all integrated upon the same semiconductor die. In other embodiments, the optical transceiver may further include a TransImpedance Amplifier (TIA), an optoelectronic transducer such as a photodiode, a sense photodiode, and/or an electro-optic transducer all integrated and/or mounted on the same semiconductor die.

Figure 1:
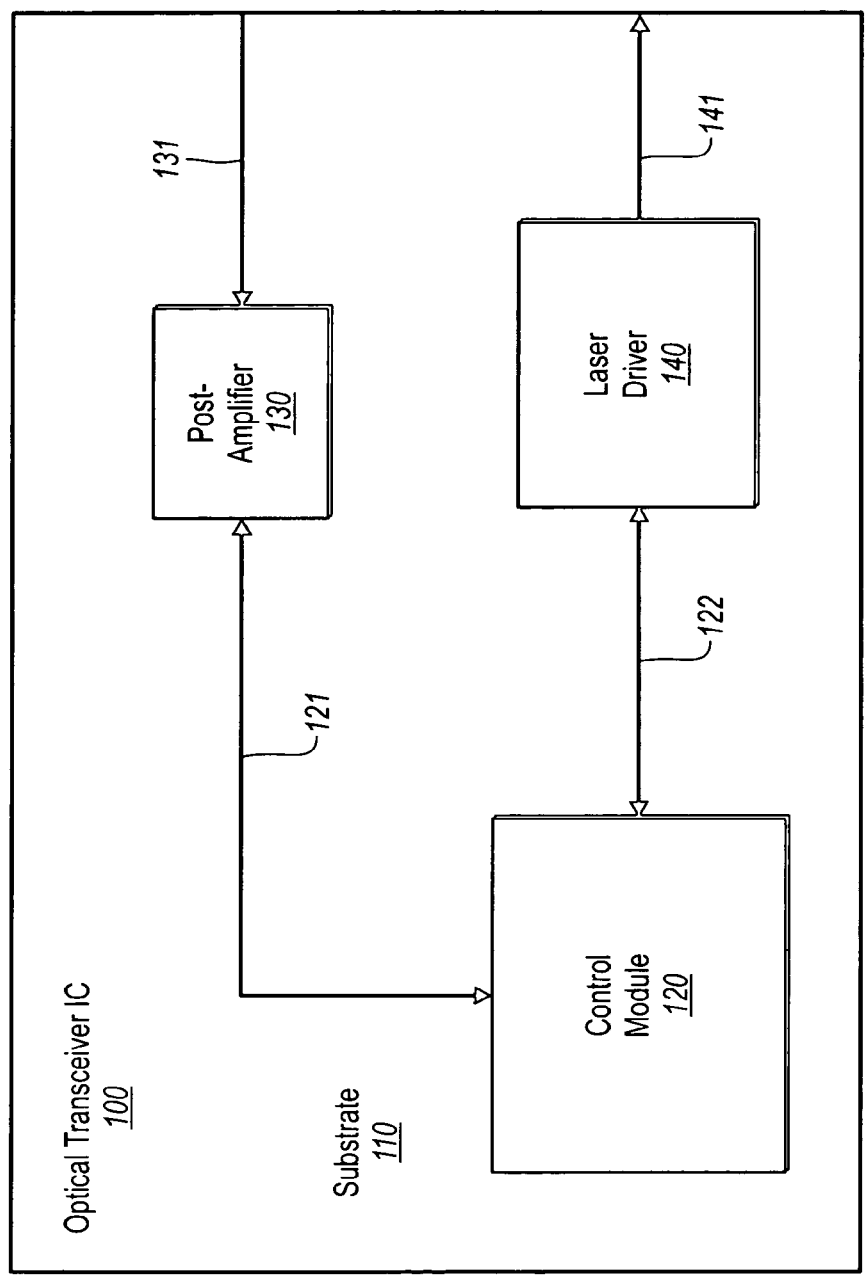
FIG. 1 illustrates an example optical transceiver IC in accordance with embodiments disclosed herein.

Turning first to FIG. 1, an optical transceiver IC 100 is illustrated. Optical transceiver IC 100 may be configured to include several different components that are directly integrated or mounted onto a substrate 110 of the optical transceiver IC 100. The components may be interconnected using electrical interconnections that are also directly integrated onto the substrate 110. Accordingly, optical transceiver IC 100 need not use a PCB for interconnections between the components that are included on the single integrated circuit die. In some embodiments, optical transceiver IC 100 may be coupled to a host computing system that controls the operation of the optical transceiver. Optical transceiver IC 100 may be able to support 1G, 2G, 4G, 8G, 10G and higher bandwidth fiber optic links. Furthermore, optical transceiver IC 100 may be able to support transmitter/receivers of any form factor such as XFP, SFP and SFF, without restriction.

As mentioned, optical transceiver IC 100 includes a substrate 110. Substrate 110 may be any reasonable substrate known in the art such as silicon or silicon germanium. In some embodiments, substrate 110 may also be gallium arsenide or indium phosphate. Note that the exact material of substrate 100 will often be determined by the types of components that are integrated onto the substrate and the process used to integrate the components. The embodiments disclosed herein contemplate using different substrates as circumstances warrant.

As mentioned, various components, which will be described in more detail to follow, are integrated or mounted directly onto substrate 110. These components may be integrated onto substrate 110 by any known semiconductor fabrication process. Examples of well-known semiconductor fabrication processes include photo lithography processes, etching processes, and growth processes. In some embodiments, the components may be fabricated using a complementary metal-oxide semiconductor process (CMOS) and/or a bipolar complementary metal-oxide semiconductor process (BiCMOS), both of which may be more cost effective than other processes, although that is not required. Advantageously, fabricating the components of the optical transceiver IC 100 onto substrate 110 may cause lower power dissipation when the optical transceiver is operated.

Substrate 110 also includes electrical interconnections (described below) between the various components that are also directly integrated onto the substrate. These electrical connections may be directly integrated onto substrate 110 by any semiconductor fabrication process known in the art. Advantageously, directly integrating the interconnections onto substrate 110 allows for interconnections without the use of a PCB.

In addition, directly integrating the interconnections onto substrate 110 may allow for increased performance. For example, because the interconnections are necessarily close together, they are less susceptible to undesirable parasitic elements such as distributed capacitance and inductance. In addition, the close proximity of the interconnections helps to reduce cross-talk and Electro-Magnetic Interference (EMI). The interconnections may also be fabricated using less expensive processing as a result of their close proximity.

Although not illustrated in FIG. 1 (or in any of the subsequent figures) optical transceiver IC 100 will be enclosed in some type of packing when implemented. The packaging is used to protect the components and interconnections integrated onto substrate 110. The packaging may include various connections that are used to connect the components of optical transceiver IC 100 with components and systems external to the IC 100. These connections may be lead frames, pins, ball gird arrays, or any type of IC external connection known in the art.

Returning to FIG. 1, in one embodiment, optical transceiver IC 100 includes a post-amplifier 130, an electro-optic transducer driver 140 and a control module 150 that are directly integrated onto substrate 110. Since lasers are in common usage, an electro-optic transducer driver 140 may also be referred to as a "laser driver" to reflect this common usage.

In operation, post-amplifier 130 is configured to communicate with an optoelectronic transducer. Specifically, post-amplifier 130 receives an electrical signal from an optoelectronic transducer such as a photodiode using interconnection 131. The post-amplifier 130 amplifies the signal and provides the amplified signal to the host computing system. As mentioned above, interconnection 131 is directly integrated onto substrate 110. The optoelectronic transducer may be external to optical transceiver IC 100. In such cases, optical transceiver IC 100 may have an external interconnection (not illustrated) to facilitate connection with the optoelectronic transducer as mentioned previously.

Laser driver 140 is configured to communicate with an electro-optic transducer such as a laser or a Light Emitting Diode (LED). Specifically, laser driver 140 receives an electrical signal from a host computing system and drives the electro-optical transducer using interconnection 141 with signals that cause the electro-optical transducer to emit optical signals representative of the information in the electrical signal provided by the host. Interconnection 141 is also directly integrated onto substrate 110. In embodiments where the electro-optical transducer is external to optical transceiver IC 100, an external connection may be implemented as discussed previously.

In some embodiments, laser driver 140 is DC coupled to the electro-optic transducer. The laser driver may have a single ended output stage or a differential output stage as circumstances warrant. DC coupling of the laser driver to the electro-optic transducer helps to ensure that both components may be directly integrated onto substrate 110.

The behavior of post-amplifier 130 and the laser driver 140 may vary dynamically due to a number of factors. For example, temperature changes, power fluctuations, and feedback conditions may each affect the performance of these components. Accordingly, the optical transceiver IC 100 may include a control module 120. Control module 120 is configured to monitor the operation of the post-amplifier 130 and the laser driver 140 using interconnections 121 and 122 respectively. In addition, control module 120 may provide control signals to and receive signals from the post-amplifier 130 and the laser driver 140 also using interconnections 121 and 122. Control module 120 may include general purpose processing capabilities and therefore optical transceiver IC 100 may be considered a computing device. As with the other interconnections previously discussed, interconnections 121 and 122 are directly integrated onto substrate 110.

Figure 2:
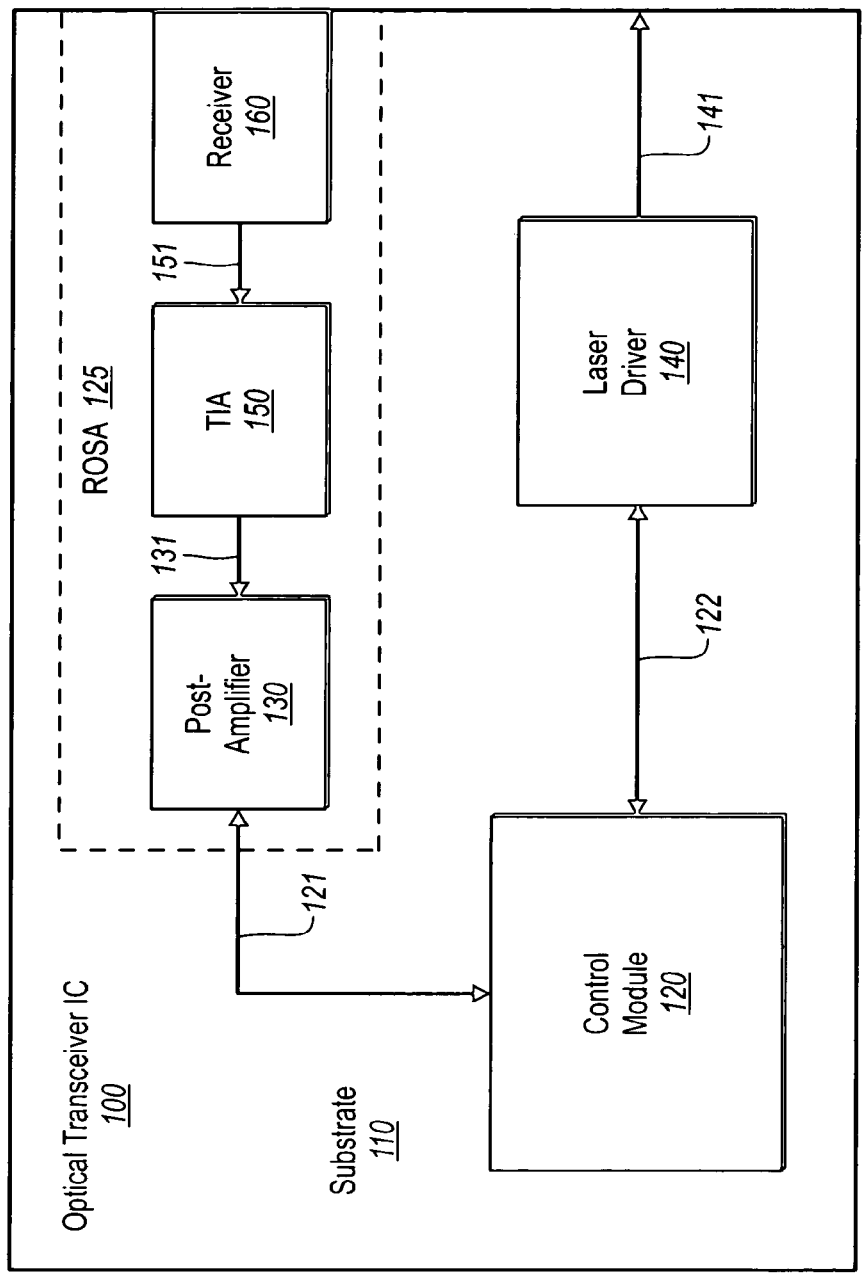
FIG. 2 illustrates another embodiment of the optical transceiver IC of FIG. 1.

Turning now to FIG. 2, another embodiment of optical transceiver IC 100 is depicted. The embodiment of FIG. 2 includes a Receive Optical SubAssembly (ROSA) 125. ROSA 125 may include post-amplifier 130, TransImpedance Amplifier (TIA) 150 and an optoelectronic transducer 160 or any combination of these three components as circumstances warrant. Note that hereinafter, an optoelectronic transducer will also be referred to simply as a "receiver" 160 for simplicity. The embodiment of FIG. 2 also includes the components previously described in relation to FIG. 1.

As illustrated, post-amplifier 130 is coupled to TIA 150 using interconnection 131. TIA 150 is configured to receive an electrical signal from receiver 160 using interconnection 160 and to provide amplification and impendence matching of the signal prior to providing the signal to the post-amplifier 130. In some embodiments, TIA 150 is directly integrated onto substrate 110 by any known semiconductor fabrication process in similar manner to the components discussed in relation to FIG. 1. In such embodiments, interconnection 151, which is directly integrated onto substrate 110, would be coupled to an external interconnection if receiver 160 were implemented external to optical transceiver IC 100.

In other embodiments, however, TIA 150 may first be fabricated on a separate substrate by any known fabrication process. TIA 150 may then be directly mounted onto substrate 110 by any mounting process known in the art in such a way that TIA 150 and post-amplifier 130 are interconnected. In this way, TIA 150 is still integrated onto optical transceiver IC 100 without the need for a PCB to interconnect the components.

In some embodiments, receiver 160 may be coupled to post-amplifier 130 either indirectly through a TIA or directly. The receiver 160, which may be a photodiode, acts as an optoelectronic transducer by transforming a received optical signal into an electrical signal. Receiver 160 may be directly integrated onto substrate 110 by any known semiconductor fabrication process in similar manner to the components discussed in relation to FIG. 1. Receiver 160 may be coupled to the post-amplifier 130 by interconnections 131 and 151, which are also directly integrated onto substrate 110 as previously discussed.

As with TIA 150, receiver 160 may be first fabricated on a separate substrate by any known fabrication process. Receiver 160 may then be directly mounted onto substrate 110 by any mounting process known in the art in such a way that receiver 160 is interconnected with TIA 150 and/or post-amplifier 130. Note that in this description and in the claims, a component that is first fabricated on a separate substrate that is then subsequently mounted onto substrate 110 is considered directly integrated with the other components of substrate 110 into a single integrated IC.

In further embodiments, both TIA 150 and receiver 160 may first be fabricated onto a separate substrate by any process known in the art. In such a case, interconnection 151 would also be part of this substrate. The combination of the TIA 150 and receiver 160 could then be mounted directly onto substrate 110 by any mounting process known in the art. The mounted combination of the TIA 150 and receiver 160 would then connect with post-amplifier 130 using interconnection 131.

Figure 3:
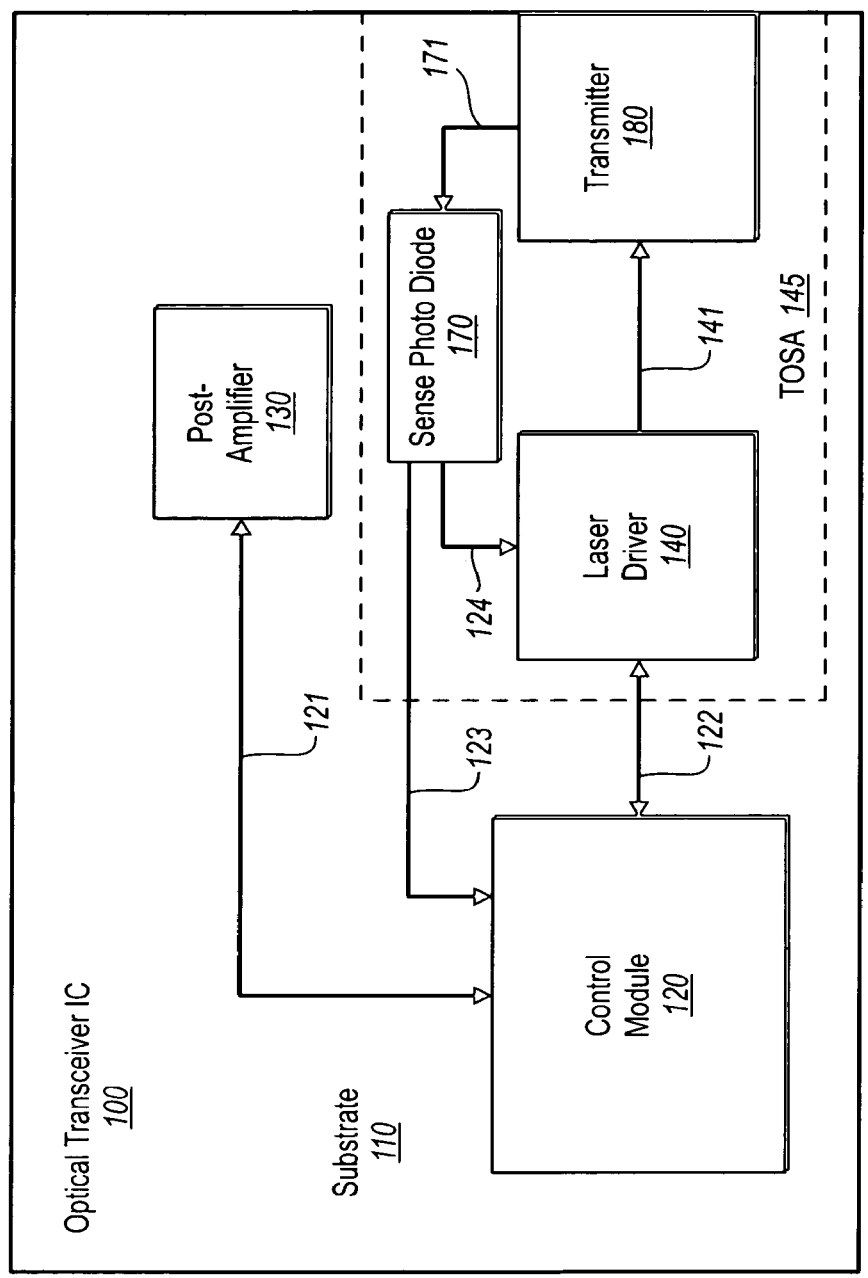
FIG. 3 illustrates an a further embodiment of the optical transceiver IC of FIG. 1.

Turning now to FIG. 3, a further embodiment of optical transceiver IC 100 is depicted. The embodiment of FIG. 3 includes a Transmit Optical SubAssembly (TOSA) 145. TOSA 145 may include laser driver 140, sense photodiode 170, and electro-optic transducer 180 or any combination of these three components as circumstances warrant. Note that hereinafter, an electro-optic transducer will also be referred to simply as a "transmitter" 180 for simplicity. The embodiment of FIG. 3 also includes the components previously described in relation to FIG. 1.

As illustrated, sense photodiode 170 is connected to control module 120 and laser driver 140 using interconnection 123 and interconnection 124 respectively. As with the other interconnections, interconnections 123 and 124 are directly integrated onto substrate 110. Sense photodiode 170 is configured to monitor the performance of transmitter 180 using interconnection 171 and to provide this information to control module 120 and/or laser driver 140. In some embodiments, sense photodiode is directly integrated onto substrate 110 by any known semiconductor fabrication process in similar manner to the components discussed in relation to FIG. 1. In such embodiments, interconnection 171, which is directly integrated onto substrate 110, would be coupled to an external interconnection if transmitter 180 were implemented external to optical transceiver IC 100.

In other embodiments, sense photodiode 170 may be first fabricated on a separate substrate by any known fabrication process. Sense photodiode 170 may then be directly mounted onto substrate 110 by any process known in the art. In this way, sense photodiode 170 is still integrated onto optical transceiver IC 100 without the need for a PCB to interconnect with other components.

Transmitter 180 may be coupled to laser driver 140. The transmitter 180, which may be a laser diode or LED, receives electrical drive signals from laser driver 140 over interconnection 141 that cause transmitter 180 to transmit optical signal representative of the information in the electrical drive signals. Transmitter 180 may be directly integrated onto substrate 110 by any known semiconductor fabrication process in similar manner to the components discussed in relation to FIG. 1.

Transmitter 180 may also be first fabricated on a separate substrate by any known fabrication process. Transmitter 180 may then be directly mounted onto substrate 110 by any process known in the art in such a way that transmitter 180 is interconnected with laser driver 140 and sense photodiode 170.

In further embodiments, both sense photodiode 170 and transmitter 180 may first be fabricated onto a substrate by any process known in the art. In such a case, interconnection 171 would also be part of this substrate. The combination of the sense photodiode 170 and transmitter 180 may then be directly mounted onto substrate 110 by any mounting process known in the art. The mounted combination of the sense photodiode 170 and transmitter 180 would then connect with laser driver 140 and control module 120 using interconnections 123, 124 and/or 141.

Figure 4:
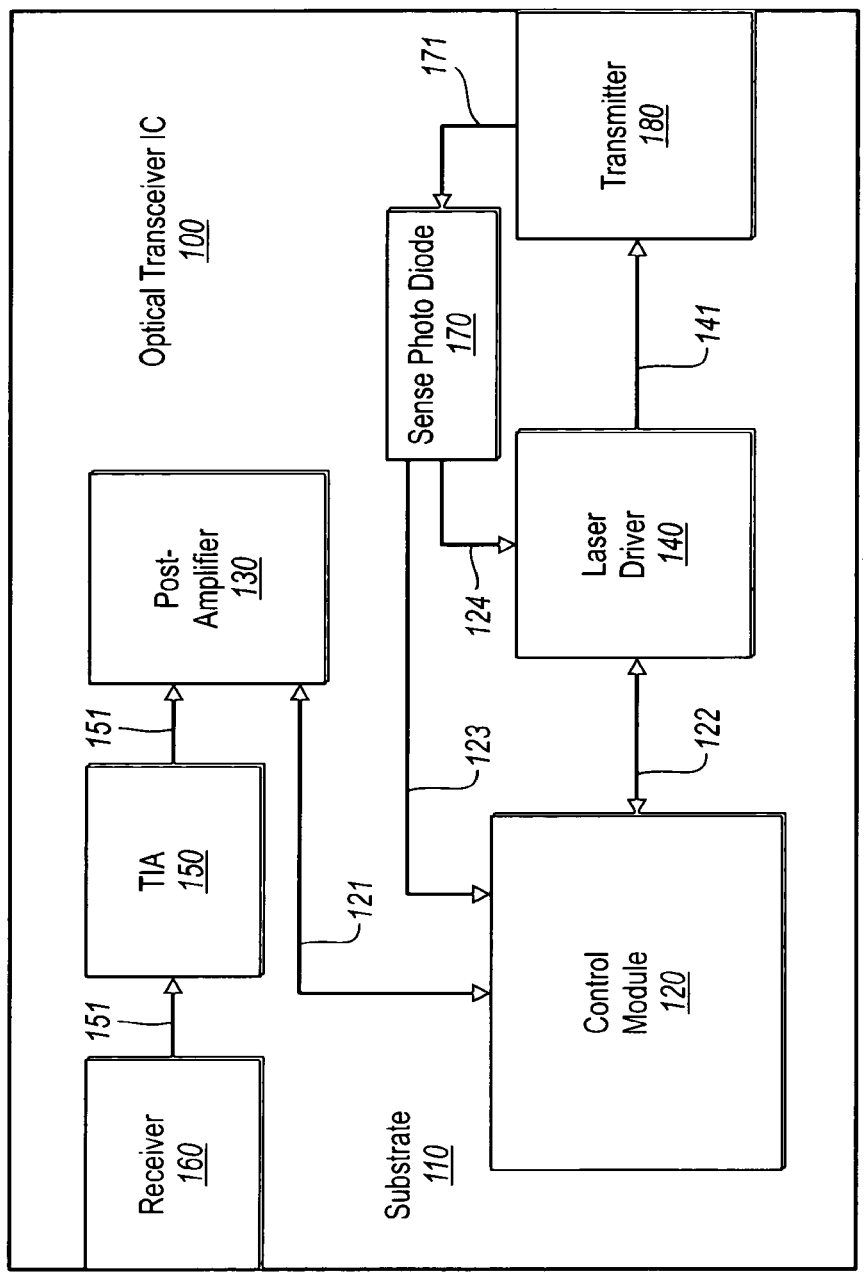
FIG. 4 illustrates an additional embodiment of the optical transceiver IC of FIG. 1.

Turning now to FIG. 4, an additional embodiment of optical transceiver IC 100 is illustrated. The embodiment of FIG. 4 includes all of the components previously discussed in relation to FIGS. 1-3, although the relative positions of some of the components on substrate 110 is illustrated differently. As previously discussed, the various components and interconnections of FIG. 4 may be directly integrated onto substrate 110 by any semiconductor fabrication process known in the art such that a PCB board is not required for interconnecting the components. In some embodiments, TIA 150 and/or receiver 160 may be first fabricated onto a separate substrate that is then directly mounted onto substrate 110 as previously described. In like manner, sense photodiode 170 and/or transmitter 180 may also be first fabricated onto a separate substrate that is then directly mounted onto substrate 110 as previously described.

Note that FIG. 4 (and the proceeding figures) are drawn for ease of illustration and are not necessarily drawn to actual scale or perspective. Accordingly, the embodiments where components such as receiver 160 and transmitter 180 are first fabricated on a separate substrate and then directly mounted onto substrate 110 may not be explicitly illustrated. A box is simply drawn to represent all the various embodiments of the various components. However, as has been previously mentioned, the principles of the present invention contemplate both directly integrating components onto substrate 110 and directly mounting components previously fabricated on separate substrate onto substrate 110, both of which may be considered as integrated onto a single IC without the use of a PCB for interconnections. In addition, the relative position of the various components in the figures is for ease of illusion only. The principles of the present invention contemplate different locations for the various components on substrate 110. Accordingly, the actual physical layout of the components on substrate 110 should not be used to limit the embodiments disclosed herein unless explicitly stated.

Although FIG. 4 illustrates all of the various components previously described, the embodiments disclosed herein also contemplate various different groupings of the components. For example, in one embodiment optical transceiver IC 100 may include control module 120, post-amplifier 130, laser driver 140, TIA 150, receiver 160, and transmitter 180. In this embodiment, the various components may be fabricated as previously described. In addition, TIA 150 and/or receiver 160 may be fabricated onto a separate substrate that is then directly mounted onto substrate 110 as previously described.

In another embodiment, optical transceiver IC 100 may include control module 120, post-amplifier 130, laser driver 140, receiver 160, sense photo diode 170 and transmitter 180. In this embodiment, the various components may be fabricated as previously described. In addition, sense photodiode 170 and/or transmitter 180 may also be fabricated onto a separate substrate that is then directly mounted onto substrate 110 as previously described. There may also be other groupings of components as circumstances warrant.

Figure 5:
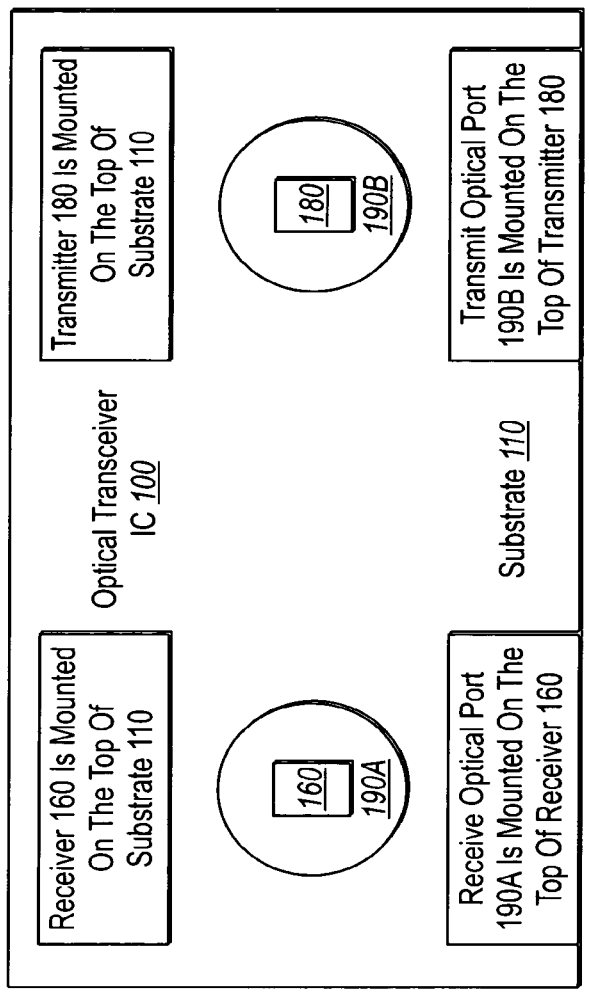
FIG. 5 illustrates an embodiment of optical ports mounted on an optical transceiver IC.

Referring now to FIG. 5, an example embodiment of a receive optical port 190A and a transmit optical port 190B are illustrated. Optical ports 190 represent the physical interface between optical transceiver IC 100 and any optical fibers that are used to transmit optical signals from optical transceiver IC 100 and transmit optical signals to transceiver 100. Optical ports 190 may be bonded to optical transceiver IC 100 in any way known in the art that will produce the required connection. In the illustrated embodiment, receiver 160 and transmitter 180 are directly mounted onto the top of substrate 110 as has been previously described. Receive optical port 190A, which is illustrated by a circle surrounding receiver 160, is then mounted on top of receiver 160 by any process known in the art. In like manner, transmit optical port 190B, which is illustrated by a circle surrounding transmitter 180, is mounted on top of transmitter 180. In some embodiments, both of the optical ports 190 may be aligned on the x-axis of IC 100 as this advantageously allows for ease of manufacture and connection to an optical fiber. Note, however, that other alignments are also contemplated by the embodiments disclosed herein.

Although not illustrated in FIGS. 1-4, optical transceiver IC 100 may include other components such as capacitors as circumstance warrant. For example, in some embodiments AC capacitors in the range of 2000 pF may be implemented to provide required capacitance in the transceiver. These particular capacitors advantageously will fit in the limited space of transceiver IC 100.

In some embodiments, optical transceiver IC 100 may be part of a multiple cell design. In such a design, one optical transceiver such as optical transceiver IC 100 may be fabricated by any process known in the art on top of another optical transceiver, which in turn may have another optical transceiver fabricated on top of it, the resulting product being integrated into a single IC. Accordingly, any number of optical transceivers may be fabricated into a single IC as part of the multiple cell design. Advantageously, this design allows for parallel processing by using the different cells for different communication links. For example, one cell may be configured to operate at 1 Gigabit per second (Gbps) while another cell was configured to operate at 2 Gbps and so on.

Accordingly, the principles of the present invention relate to a semiconductor only optical transceiver. The components of the optical transceiver and corresponding interconnections are directly integrated onto a semiconductor substrate, thus forming an integrated IC. Advantageously this removes the need to implement a PCB for interconnecting the components of the optical transceiver. As a result, manufacturing time and associated costs may be lowered as well known semiconductor fabrication processes may be implemented to fabricate the optical transceiver ICs. In addition, the overall size of the optical transceiver may be lowered. Further, directly integrating the components and interconnects as an IC may cause lower power dissipation and lower parasitic signal problems. Accordingly, the principles of the present invention are a significant advancement in the art of optical transceivers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A transceiver comprising:
   a semiconductor substrate;
   a first optical transceiver cell including a first set of components integrated on the semiconductor substrate: a first laser driver, a first post-amplifier, a first transmitter, a first receiver, a first interconnection between the first transmitter and the first laser driver, and a second interconnection between the first post-amplifier and the first receiver, wherein the first set of components are each fabricated via a semiconductor fabrication process in a single semiconductor die; and
   a second optical transceiver cell that is optically isolated from the first optical transceiver cell, the second optical transceiver cell including a second set of components directly integrated on the semiconductor substrate: a second laser driver, a second post-amplifier, a second receiver, a second transmitter, a third interconnection between the second receiver and the second post-amplifier, and a fourth interconnection between the second laser driver and the second transmitter, wherein the second optical transceiver cell is fabricated via the semiconductor fabrication process underneath the first optical transceiver cell in a single integrated circuit and in the single semiconductor die with the first optical transceiver cell;
   a first optical port that is configured for communication of optical signals to the first receiver from a first optical fiber;
   a second optical port that is configured for communication of optical signals from the first transmitter to a second optical fiber;
   a third optical port that is configured for communication of optical signals to the second receiver from a third optical fiber; and
   a fourth optical port that is configured for communication of optical signals from the second transmitter to a fourth optical fiber, and
   wherein the first transmitter and the first receiver are configured to communicate information on a first communication link and the second transmitter and the second receiver are configured to communicate information on a second communication link.

2. The transceiver of claim 1, wherein the first optical port, the second optical port, the third optical port, and the fourth optical port are aligned along an axis.

3. The transceiver of claim 1, wherein:
   the first optical transceiver cell further includes a first sense photo diode that is integrated on the semiconductor substrate; and
   the second optical transceiver cell further includes a second sense photo diode that is integrated on the semiconductor substrate.

4. The transceiver of claim 1, wherein the second set of components are each fabricated via the semiconductor fabrication process in the single semiconductor die.

* * * * *